United States Patent Office.

AARON T. ESTABROOK, OF RAYMOND, KANSAS.

REMEDY FOR CHOLERA.

SPECIFICATION forming part of Letters Patent No. 354,975, dated December 28, 1886.

Application filed October 30, 1886. Serial No. 217,597. (No specimens.)

*To all whom it may concern:*

Be it known that I, AARON T. ESTABROOK, a citizen of the United States, residing at Raymond, in the county of Rice and State of Kansas, have invented certain new and useful Improvements in Medicine; and I do hereby declare that the following is a full, clear, and exact description of the same.

The present invention relates to a compound or medicine for the treatment of cholera or other like stomach troubles in animals or human beings, which will give immediate relief to the sufferer and which is harmless in its nature.

The compound consists of the following ingredients, combined in the proportions stated, viz: alcohol, one pint; gum-guaiac, two ounces; pulverized cinnamon, two ounces; pulverized cloves, two ounces; these ingredients to be mixed with the alcohol and allowed to stand two or three days until the gum-guaiac is dissolved or cut, and after well shaking the mixture it is then drained off and one pint of good rye whisky, two ounces of laudanum, one ounce blackberry extract, and one ounce of the extract of wild cherry are added, after which the compound is complete and ready for use. It is to be taken internally in the doses and at the times prescribed in the following: for all stomach complaints, for adults, from one tea-spoonful to a table-spoonful, diluted in two or three table-spoonfuls of water, taken every fifteen minutes until relieved, and in children from ten drops to one tea-spoonful diluted in about one table-spoonful of water, taken every fifteen minutes until relieved; for animals, from one-half ounce to one ounce diluted in one-half pint of water, the dose to be repeated every fifteen minutes until relieved.

The frequency of the dose, as above described, may be varied, and also the size of dose to suit the requirements of each case, and in cramp-colic, cholera-morbus, cholera-infantum, and all other like stomach complaints the doses may be increased or diminished, as it is obvious that the stated proportion of the ingredients may be slightly varied to suit the nature of the animal to which the compound is to be administered, as some animals will require a stronger dose than others to render it effective. In administering the compound to horses it may be accomplished in the usual way, by opening their mouths and pouring the liquid down their throats; but with hogs the compound may be mixed with their feed after being diluted as above specified.

Having now fully described my invention, what I claim as new, and desire to secure by Letters Patent, is—

The herein-described compound or mixture of ingredients to form a medicine for the treatment of cholera or other stomach complaints, consisting of alcohol, gum-guaiac, cinnamon, cloves, whisky, laudanum, blackberry extract, and extract of wild cherry, in about the proportions herein specified.

In testimony that I claim the above I have hereunto subscribed my name in the presence of two witnesses.

AARON T. ESTABROOK.

Witnesses:
JOHN V. WILSON,
JOSEPH B. SHEPHERD.